US008140459B2

(12) United States Patent
Bjorner et al.

(10) Patent No.: US 8,140,459 B2
(45) Date of Patent: Mar. 20, 2012

(54) RELEVANCY PROPAGATION FOR EFFICIENT THEORY COMBINATION

(75) Inventors: Nikolaj Bjorner, Woodinville, WA (US); Leonardo Mendonca de Moura, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 831 days.

(21) Appl. No.: 12/035,417

(22) Filed: Feb. 21, 2008

(65) Prior Publication Data
US 2009/0216701 A1  Aug. 27, 2009

(51) Int. Cl.
*G06F 17/00* (2006.01)
*G06N 5/02* (2006.01)

(52) U.S. Cl. ............ 706/47; 716/106; 717/104; 717/126
(58) Field of Classification Search ................... None
See application file for complete search history.

(56) References Cited

U.S. PATENT DOCUMENTS

| 6,556,978 | B1 | 4/2003 | Ginsberg et al. |
|---|---|---|---|
| 6,651,234 | B2 | 11/2003 | Gupta et al. |
| 7,249,333 | B2 | 7/2007 | Yu et al. |
| 2003/0084411 | A1 | 5/2003 | Moskewicz et al. |
| 2004/0019468 | A1 | 1/2004 | De Moura et al. |
| 2005/0240885 | A1 | 10/2005 | Ganai et al. |
| 2007/0011629 | A1* | 1/2007 | Shacham et al. .......... 716/3 |
| 2007/0074152 | A1 | 3/2007 | Roe |
| 2007/0179920 | A1 | 8/2007 | Zhang |
| 2008/0250376 | A1* | 10/2008 | Burch et al. ............ 716/13 |

OTHER PUBLICATIONS

Baumgartner, et al., "Darwin: A Theorem Prover for the Model Evolution Calculus", at <<http://combination.cs.uiowa.edu/Darwin/papers/darwin-ESFOR.pdf>>, ESFOR, 2004, pp. 25.
Bryant, et al., "Deciding Bit-Vector Arithmetic with Abstraction", available at least as early as Sep. 7, 2007 at <<http://www.eecs.berkeley.edu/~sseshia/pubdir/uclid-tacas07.pdf>>, pp. 15.
Slater, "Investigations into Satisfiability Search", at <<http://users.rsise.anu.edu.au/~andrews/papers/andrewslater_thesis.pdf>>, THe Australian National University, Jan. 2004, pp. 138.

* cited by examiner

*Primary Examiner* — Omar Fernandez Rivas
*Assistant Examiner* — Kalpana Bharadwaj
(74) *Attorney, Agent, or Firm* — Lee & Hayes, PLLC

(57) ABSTRACT

Relevancy propagation for efficient theory combination is described. In one implementation, an efficient SMT solver dynamically applies relevancy propagation to limit propagation of unnecessary constraints in a DPLL-based solver. This provides a drastic increase in speed and performance over conventional DPLL-based solvers. The relevancy propagation is guided by relevancy rules, which in one implementation emulate Tableau rules for limiting constraint propagation, while maintaining the performance of efficient DPLL-based solvers. An exemplary solver propagates truth assignments to constraints of a formula, and tracks which truth assignments are relevant for determining satisfiability of the formula. The solver propagates truth assignments that were marked relevant to a theory solver, while avoiding propagation of irrelevant truth assignments. The efficient SMT solver provides a drastic reduction in search space covered during quantifier instantiation and offers profound acceleration during bit-vectors reasoning.

18 Claims, 8 Drawing Sheets

RELEVANCY PROPAGATION FOR EFFICIENT THEORY COMBINATION

BACKGROUND

"SMT" (Satisfiability Modulo Theories) generalizes Boolean satisfiability (SAT) by adding equality reasoning, arithmetic, fixed-size bit-vectors, arrays, quantifiers, and other useful first-order theories. An SMT solver is a tool for deciding the satisfiability or validity of formulas using these theories. SMT solvers enable applications such as extended static checking, predicate abstraction, test case generation, bounded model checking over infinite domains, etc.

SMT solvers that perform searching over a large set of constraints need to maintain, update, and propagate truth assignments to atomic constraints ("atoms") of a received formula being tested for satisfiability. Each new truth assignment may lead to additional constraint propagation, which is costly. The relative costliness depends on the constraint domain (real or integer linear arithmetic, bit-vectors, . . . , quantified formulas). For these expensive constraint domains, it is very desirable to limit case splits and constraint propagation to only cases that are relevant for solving the constraints.

Consider the following simplified example:

$$a<1 \vee (a+b>0 \wedge b<0)$$

The example is a disjunction that requires either a to be less than 1, or requires a+b to be strictly greater than 0, but b to be less than 0. Assume that a and b range over integers, so that the legal values for a and b are the numbers . . . −2, −1, 0, 1, 2, . . . . The formula is satisfiable. A satisfying assignment is $\{a \rightarrow 0, b \rightarrow 3\}$. The assignment satisfies the first disjunction, but it cannot be used for the second disjunction. A satisfying assignment for the second disjunction is $\{a \rightarrow 2, b \rightarrow -1\}$. The truth value of the atom a+b>0 is irrelevant when satisfying the first disjunction, and thus it is a waste of resources to satisfy either a+b>0 or the negation a+b≦0.

Conventional approaches to combining constraint solvers with efficient solvers for propositional satisfiability do not have mechanisms for avoiding the unnecessary propagation of irrelevant atoms. What is needed is a way to avoid such propagation, resulting in vast acceleration over the conventional approaches.

SUMMARY

Relevancy propagation for efficient theory combination is described. In one implementation, an efficient SMT solver dynamically applies relevancy propagation to limit propagation of unnecessary constraints in a DPLL-based solver. This provides a drastic increase in speed and performance over conventional DPLL-based solvers. The relevancy propagation is guided by relevancy rules, which in one implementation emulate Tableau rules for limiting constraint propagation, while maintaining the performance of efficient DPLL-based solvers. An exemplary solver propagates truth assignments to constraints of a formula, and tracks which truth assignments are relevant for determining satisfiability of the formula. The solver propagates truth assignments that were marked relevant to a theory solver, while avoiding propagation of irrelevant truth assignments. The efficient SMT solver provides a drastic reduction in search space covered during quantifier instantiation and offers profound acceleration during bit-vectors reasoning.

This summary is provided to introduce the subject matter of relevancy propagation for efficient theory combination, which is further described below in the Detailed Description. This summary is not intended to identify essential features of the claimed subject matter, nor is it intended for use in determining the scope of the claimed subject matter.

DETAILED DESCRIPTION

Overview

This disclosure describes relevancy propagation for efficient theory combination, e.g., in SMT solvers used for software analysis and verification. Systems and methods described herein improve upon conventional approaches to combining constraint solvers with efficient solvers for propositional satisfiability. Conventional techniques indiscriminately propagate theory constraints based on truth assignments chosen by the SAT solver. The exemplary system, on the other hand, provides a mechanism for avoiding unnecessary propagation of irrelevant atomic constraints or "atoms" of the formula. This results in vast acceleration over the conventional techniques.

The exemplary system introduces a notion of relevancy propagation into an efficient SAT solver framework. The imparted relevancy tracks subsets of constraints that are useful—exemplary relevancy propagation keeps track of which truth assignments are essential for determining satisfiability of a formula. Atoms that are marked as relevant have their truth assignment propagated to theory solvers, but the exemplary system avoids propagating truth assignments for atoms that are not marked as relevant.

In one implementation, the exemplary system dynamically applies relevancy propagation by simulating Tableau rules in a Davis Putnam Longman Loveland-Theory ("DPLL(T)")-based solver. While much faster than Tableau solvers, conventional DPLL(T)-based solvers do not enjoy the Tableau relevancy property of eliminating irrelevant formulas from the scope of a branch. Hence, the exemplary system described herein dynamically emulates the relevancy propagation inherent in Tableau solvers, but in a DPLL solver. That is, the exemplary system limits unnecessary constraint propagation, a feature that Tableau solvers offer for free, while providing the speed and performance of a DPLL(T) solver.

Exemplary System

Figure 1:
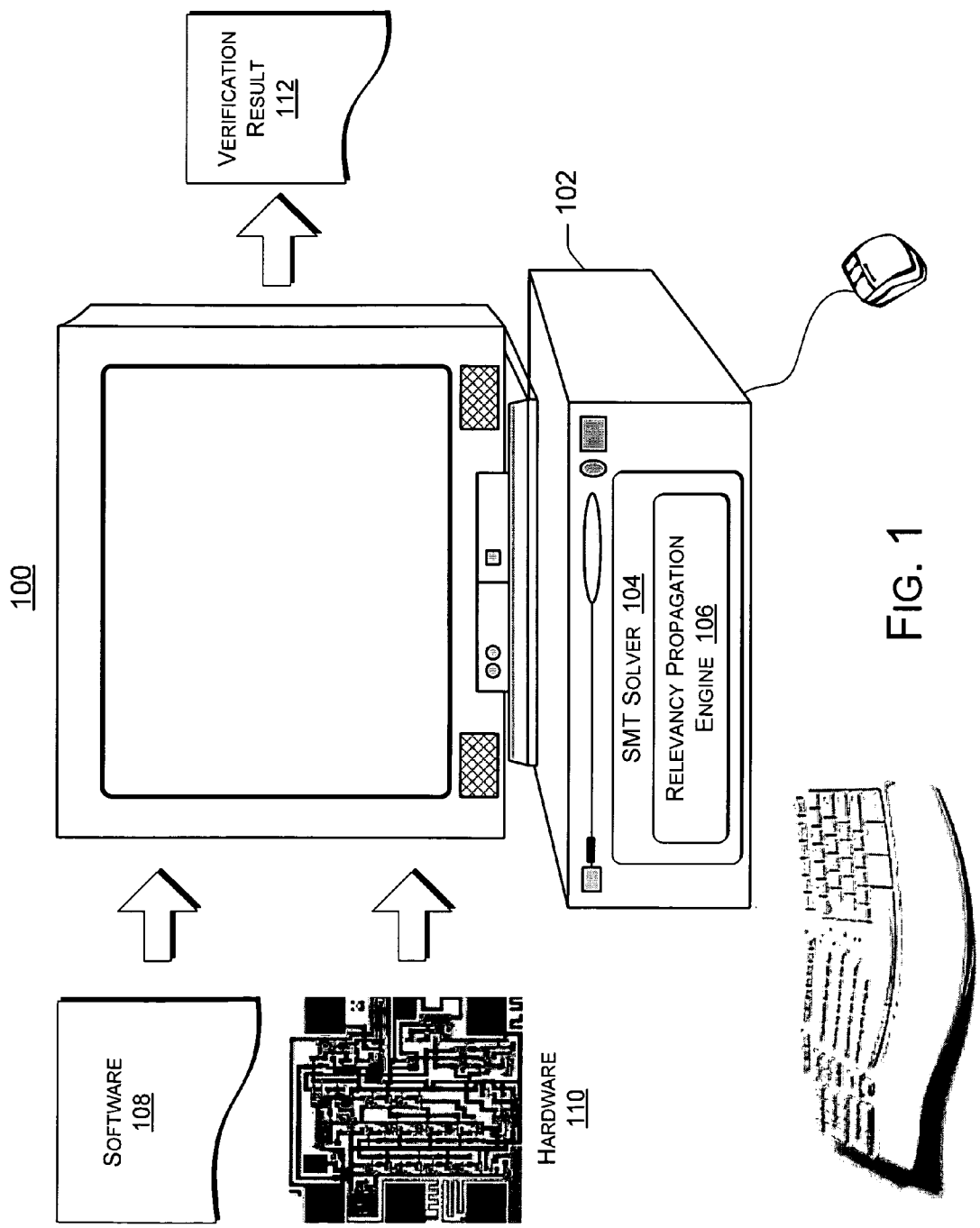
FIG. 1 is a diagram of an exemplary verification system including a SMT solver and a relevancy propagation engine.

FIG. 1 shows an exemplary verification system 100. Many industry tools rely on powerful verification engines. The verification system 100 is described representatively using an SMT context as an example for the sake of description. Other verification platforms include, for example, Boolean satisfiability (SAT) solvers and binary decision diagrams (BDDs). SMT solvers represent the "next generation" of verification engines, and include SAT solvers and theories to variously handle arithmetic, arrays, and uninterrupted functions. Many problems are more naturally expressed in SMT, which also lends itself well to automation.

In FIG. 1, a computing device 102 hosts an exemplary SMT solver 104, which in turn includes an exemplary relevancy propagation engine 106. The computing device 102 may be a desktop computer, notebook computer, or other computing device that has a processor, memory, data storage, etc.

The SMT solver 104, and SMT solvers in general, can be used for many modeling, satisfiability, and verification tasks, represented schematically in FIG. 1 as verifying or determining satisfiability of arbitrary formulas that constitute the functional logic of software 108 or that constitute the functional logic of hardware 110, such as microprocessors. Many present-day development toolboxes include an SMT solver 104 either explicitly or built-in behind the scenes.

The exemplary SMT solver 104 in FIG. 1 receives formulas as input, representing the software 108 or circuit logic of hardware 110. The relevancy propagation engine 106 enables the SMT solver 104 to produce a verification result 112 faster and more efficiently than conventional SMT solving techniques.

Exemplary Engine

Figure 2:
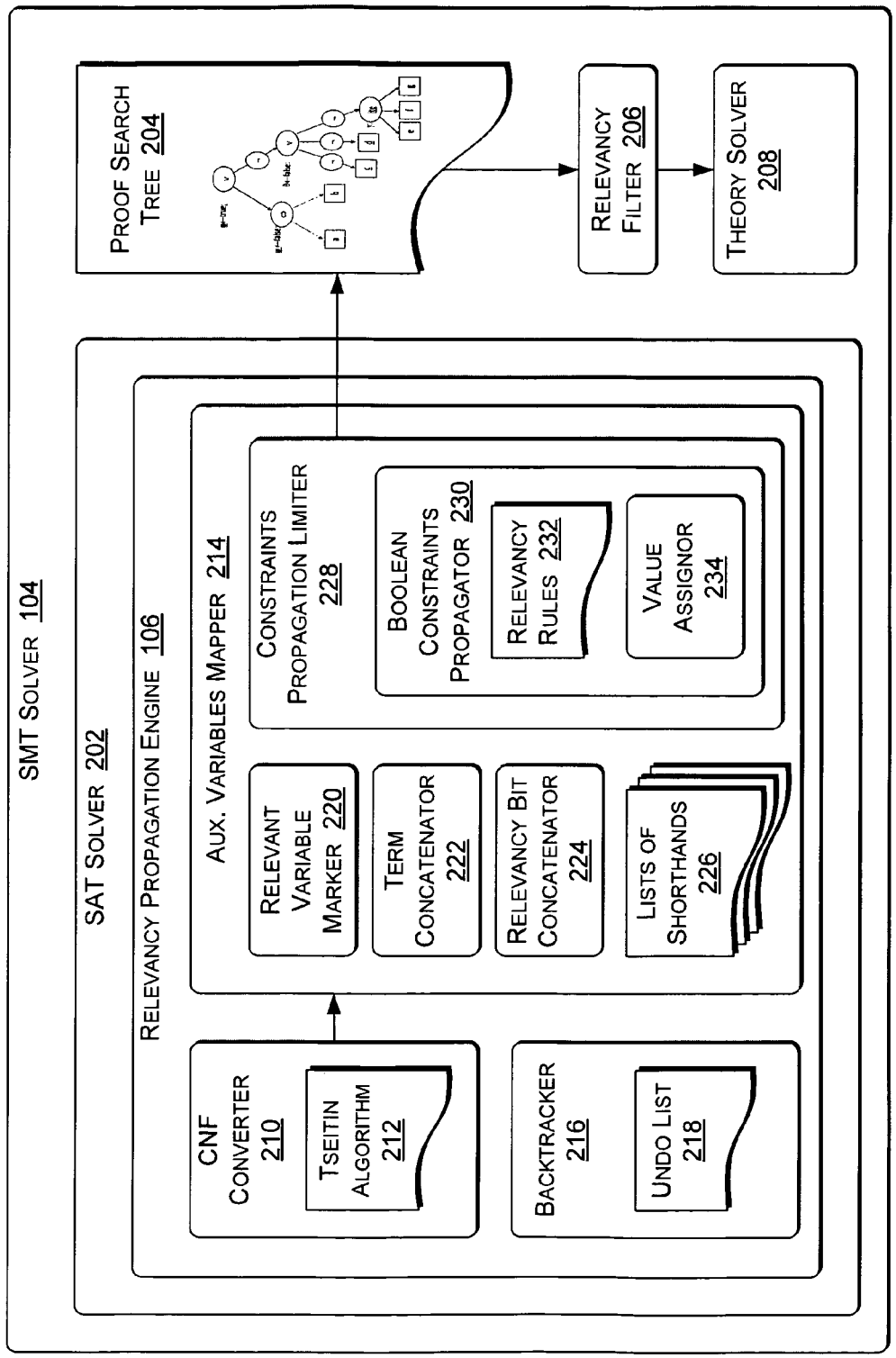
FIG. 2 is a block diagram of an exemplary SMT solver.

FIG. 2 shows the exemplary SMT solver 104 and relevancy propagation engine 106 of FIG. 1 in greater detail. The components and layout of the exemplary SMT solver 104 are just one example for the sake of description. Other components and layouts are possible for the exemplary SMT solver 104 and relevancy propagation engine 106.

Before describing operation of the exemplary engine 104, a list of example components is now described. The exemplary SMT solver 104 includes a SAT solver 202 that produces a proof search tree 204. A relevancy filter 206 between the proof search tree 204 and the theory solver 208 limits propagation of irrelevant atoms to the theory solver 208.

In the illustrated implementation, the SAT solver 202 includes the exemplary relevancy propagation engine 106. In one implementation, the relevancy propagation engine 106 includes a conjunctive normal form (CNF) converter 210 that relies on a Tseitin-style algorithm 212, a Tseitin auxiliary variables mapper 214, and a backtracker 216 in conformance with DPLL(T) engines, that uses an undo list 218. All variations of Tseitin's algorithm 212 can be used. A Tseitin-style algorithm, for purposes of this description, is any CNF converter that creates auxiliary variables. The Tseitin algorithm is detailed in Tseitin, G. S., "On the complexity of derivation in propositional calculus," *Automation of Reasoning* 2, *Classical Papers on Computational Logic*, 1967-1970, Springer-Verlag, 1983, pp. 466-483, which is incorporated herein by reference.

The auxiliary variables mapper 214 further includes a relevant variables marker 220, a term concatenator 222, a relevancy bit concatenator 224, a list of shorthands 226, and a constraints propagation limiter 228. The constraints propagation limiter 228 includes a Boolean constraints propagator 230 that includes relevancy rules 232 supporting a value assignor 234. The value assignor 234 determines values for the variables designated by the relevant variable marker 220.

Operation of the Exemplary Engine

To understand the exemplary relevancy propagation engine 106, two popular proof search calculi are now described. The first calculus, called the Tableau calculus, creates a proof search tree by decomposing an input formula into pieces. The second calculus, the DPLL calculus, creates a proof search tree 204 by case splitting on truth values of the propositional atoms in a formula. The DPLL calculus disregards the formula structure. Both calculi are presented as refutation calculi. This means that in order to prove that an assertion φ is valid the calculi create the negation, ¬φ, and try to derive a contradiction, or find a model for ¬φ. Aspects of both of these proof search calculi enter into a description of the exemplary relevancy propagation engine 106.

Tableau Search

Tableau proof search engines retain some of the structure of the input formula as an "and-or" tree. A Tableau style search proceeds by cases: to refute a disjunction, each disjunct is refuted independently. Refuting a conjunction only requires retaining each conjunct. Conjunctions can be represented by negated disjunctions by using the de-Morgan rules. A branch is contradictory if it contains both a formula and its negation. Tableau rules for the main propositional connectives can be summarized below:

$$\frac{\bigvee_{i=1}^{k} \phi_i}{\phi_1 | \ldots | \phi_k} \qquad \frac{\neg \bigvee_{i=1}^{k} \phi_i}{\neg \phi_1, \ldots, \neg \phi_k} \neg \vee$$

$$\frac{\neg \neg \phi}{\phi} \neg \neg$$

$$\frac{\phi \leftrightarrow \psi}{\phi, \psi | \neg \phi, \neg \psi} \leftrightarrow \qquad \frac{\neg (\phi \leftrightarrow \psi)}{\phi, \neg \psi | \neg \phi, \psi} \neg \leftrightarrow$$

$$\frac{ite(\phi_1, \phi_2, \phi_3)}{\phi_1, \phi_2 | \neg \phi_1, \phi_3} ite \qquad \frac{\neg ite(\phi_1, \phi_2, \phi_3)}{\phi_1, \neg \phi_2 | \neg \phi_1, \phi_3} \neg ite$$

The ∨-rule takes a disjunction of formulas $\phi_1, \ldots, \phi_k$ and creates k branches. In order for the disjunction to be unsatisfiable each disjunct must be contradictory, hence the k branches.

The ¬∨-rule takes a negated disjunction and creates k new formulas in the same branch. The negated disjunction is contradictory if some combination of the constituents is contradictory.

The ¬¬ rule removes a double negation.

The rules for bi-implication create two branches. In the positive case, the branches cover the conditions where both φ and ψ hold, or both φ and ψ don't hold. In the negative case the branches cover the conditions where φ holds, but ψ does not, or vice versa.

The rules for if-then-else (called ite) are motivated in a similar way as the other rules.

The Tableau search has the side effect of eliminating irrelevant formulas from the scope of a branch. For example, to derive a contradiction for a disjunction $\vee_i \phi_i$ the search examines each disjunction. No information is propagated or required about other disjuncts.

DPLL Search

A DPLL search proceeds by case splits on atomic sub-formulas appearing in the goal ¬φ. A simplistic way to characterize DPLL is by the decide rule:

$$\frac{\neg \phi[p]}{\neg \phi[\text{true}] | \neg \phi[\text{false}]} \text{decide}$$

To refute ¬φ, which contains the propositional atom p, the term ¬φ[p] is reduced by replacing p by true and by replacing p by false. If both reduced formulas are contradictory, then the original formula is contradictory.

Efficient implementations of DPLL operate on formulas in conjunctive normal form (CNF). CNF formulas consist of a set of clauses, in which each clause represents a disjunction of literals. DPLL can be extended to handle non-propositional problems by accumulating the truth assignments to atomic formulas and making these available to theory solvers that understand only how to handle truth assignments to atoms. These extensions are commonly referred to as DPLL(T).

Exemplary Relevancy Propagation

The DPLL(T)-based solvers do not have the isolation property enjoyed by Tableau proof systems, as the search assigns a Boolean value to potentially all atoms appearing in a goal. For example, when classifying $l_1 \vee (l_2 \wedge l_3)$ using a Tseitin-style algorithm 212 the following set of clauses is obtained (the last clause can be omitted while preserving satisfiability):

$$\{l_1, l_{aux}\}, \{l_2, \neg l_{aux}\}, \{l_3, \neg l_{aux}\}, \{l_{aux}, \neg l_2, \neg l_3\}.$$

Supposing that $l_1$ is assigned true, then in this case, $l_2$ and $l_3$ are clearly irrelevant and truth assignments to $l_2$ and $l_3$ need not be propagated to the theory solvers 208, but the Tseitin encoding, which creates a set of clauses, makes the act of discovering this difficult.

The advantage of using relevancy is profound if literals that are pruned from the scope of a branch may produce new quantifier instantiations, or result in a massive amount of constraint propagation. It is therefore an advantage for the relevancy propagation engine 106 to retain the traits of relevancy in the DPLL(T)-based SAT solver 202. The exemplary relevancy propagation engine 106, however, does not change how the SAT solver 202 works with respect to case-split heuristics, unit propagation, conflict resolution, etc. For example, the SAT solver 202 may eliminate conjunctions by applying the de-Morgan rules so that the relevancy propagation engine 106 only has to handle disjunctions and negations. Thus, in one implementation, instead of changing how the SAT solver 202 works, the CNF converter 210 changes format to conjunctive normal form using a variation of the Tseitin algorithm 212, and keeps the input formula.

The auxiliary variables mapper 214 maps each (Tseitin) auxiliary variable to a node in the original formula. Initially, only the auxiliary variable corresponding to the root in the original formula is marked as relevant. The constraints propagation limiter 228 then propagates relevancy to sub-formulas using relevancy rules, such as the exemplary relevancy rules 232 that follow below. These exemplary relevancy rules 232 effectively simulate the Tableau rules, and the benefits thereof. Assume that $\phi$ is marked as relevant:

Rule 1: Let $\phi$ be shorthand for $\vee_i \phi_i$, if $\phi$ is assigned true and is marked as relevant, then the first child $\phi_i$ that gets assigned true is marked relevant. If $\phi$ is assigned false and is marked as relevant, then all children are marked relevant.

Rule 2: Let $\phi$ be shorthand for $(\phi_1 \leftrightarrow \phi_2)$, if $\phi$ is marked as relevant, then both $\phi_1$ and $\phi_2$ are marked as relevant.

Rule 3: Let $\phi$ be ite$(\phi_1, \phi_2, \phi_3)$, if $\phi$ is marked as relevant, then $\phi_1$ is marked as relevant, and if $\phi_1$ is assigned to true(false), then $\phi_2$ ($\phi_3$) is marked as relevant.

In one implementation, constraint propagation at the Boolean constraints propagator 230 triggers the exemplary relevancy rules 232. The relevancy rules 232 suggest that two different kinds of events are to be tracked: 1) when the relevant variable marker 220 designates a variable as relevant; and 2) when the value assignor 234 determines a value for one of the variables marked as relevant. The relevancy bit concatenator 224 attaches a relevancy bit to each variable. The undo list 218 in the backtracker 216 is used to restore the value of this bit during backtracking. If a variable is a shorthand for some term, the term concatenator 222 attaches the term to the variable. For each literal, the lists of shorthands 226 keep a list rw of shorthand variables. The shorthand $\phi$ is a member of rw[$\phi'$] iff term[$\phi$]=$\phi_1 \neg \ldots \neg \phi_n$, and $\phi'=\phi_i$ for some i∈[1,n], or term[$\phi$]=ite($\phi'$, $\phi_2$, $\phi_3$). The variable $\phi'$ is dubbed a child of $\phi$. The lists of shorthands 226 rw are necessary because triggering rule 1 and rule 3 of the relevancy rules 232 may depend on the truth assignment of a child variable (i.e., $\phi'$).

In standard DPLL(T), the atom attached to a Boolean variable $\phi$ is sent to the theory solver T 208 as soon as $\phi$ is assigned by the SAT solver 202. The relevancy filter 206, however, only sends the truth assignment for an atomic constraint to the theory solver T 208 after $\phi$ is assigned and after the relevancy filter 206 checks to determine that the relevancy bit is marked as true.

Relevancy Propagation Example

Figure 3:
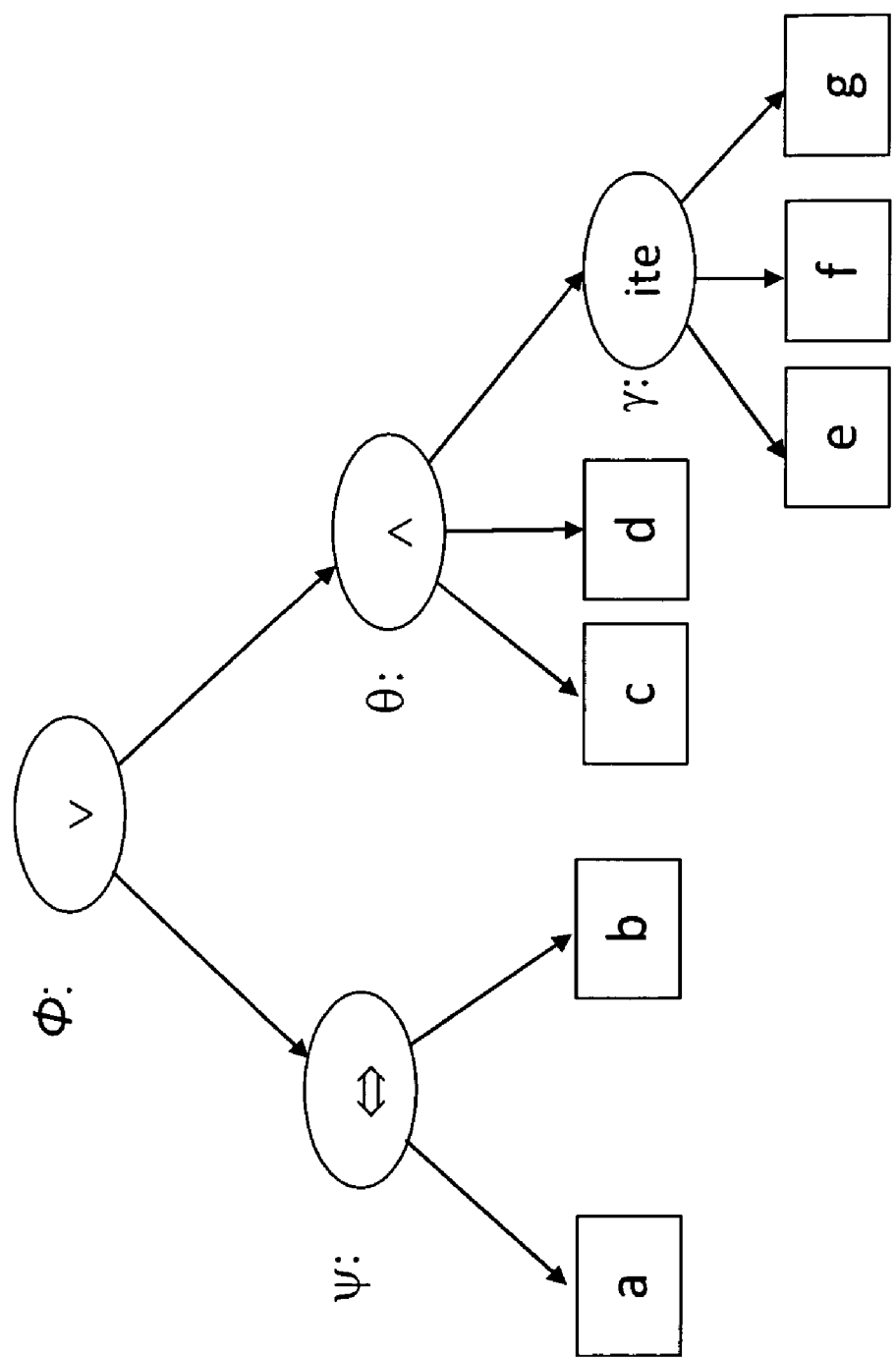
FIG. 3 is diagram of an exemplary proof search tree representing a formula.
Figure 4:
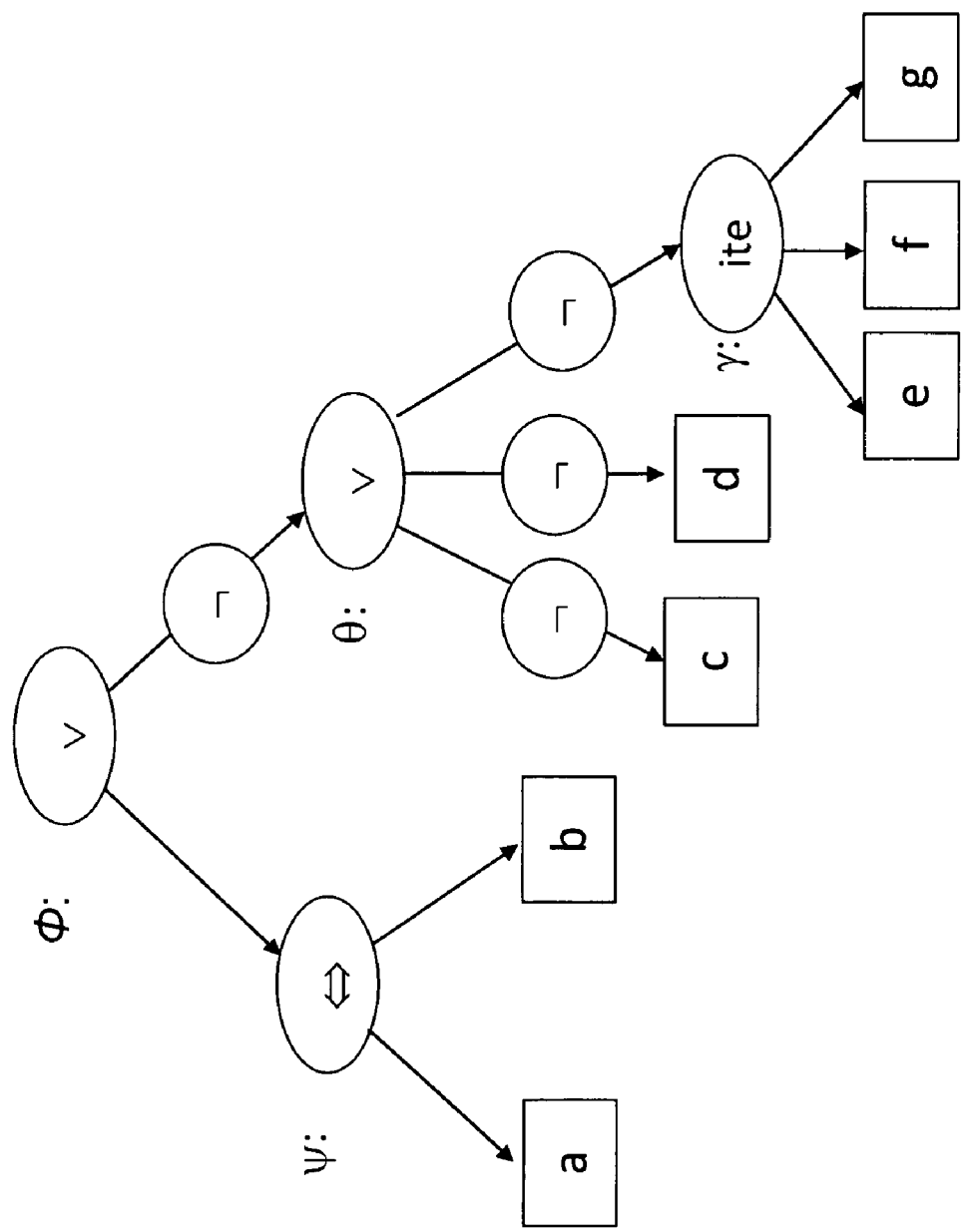
FIG. 4 is diagram of an exemplary proof search tree representing a reduction of the formula in FIG. 3.

FIGS. 3-7 show a relevancy propagation example. Consider the formula: $\phi$: $(a \Leftrightarrow b) \vee (c \wedge d \wedge$ ite$(e, f, g))$. The subformulas are annotated as well, so that $\psi$: $a \Leftrightarrow b$, $\theta$: $c \wedge d \wedge \gamma$, and $\gamma$: ite$(e, f, g)$, as shown in FIG. 3.

As mentioned above, conjunctions can be eliminated by applying the de-Morgan rules, so that the relevancy propagation engine 106 only has to handle disjunctions and negations.

The reduced formula is: $\phi$: $(a \Leftrightarrow b) \vee \neg(\neg c \vee \neg d \vee \neg$ite$(e, f, g))$ with subformulas: $\psi$: $a \neg b$, $\theta$: $\Leftrightarrow c \vee \vee d \neg \neg \gamma$, and $\gamma$: ite$(e, f, g)$, shown in FIG. 4.

Figure 5:
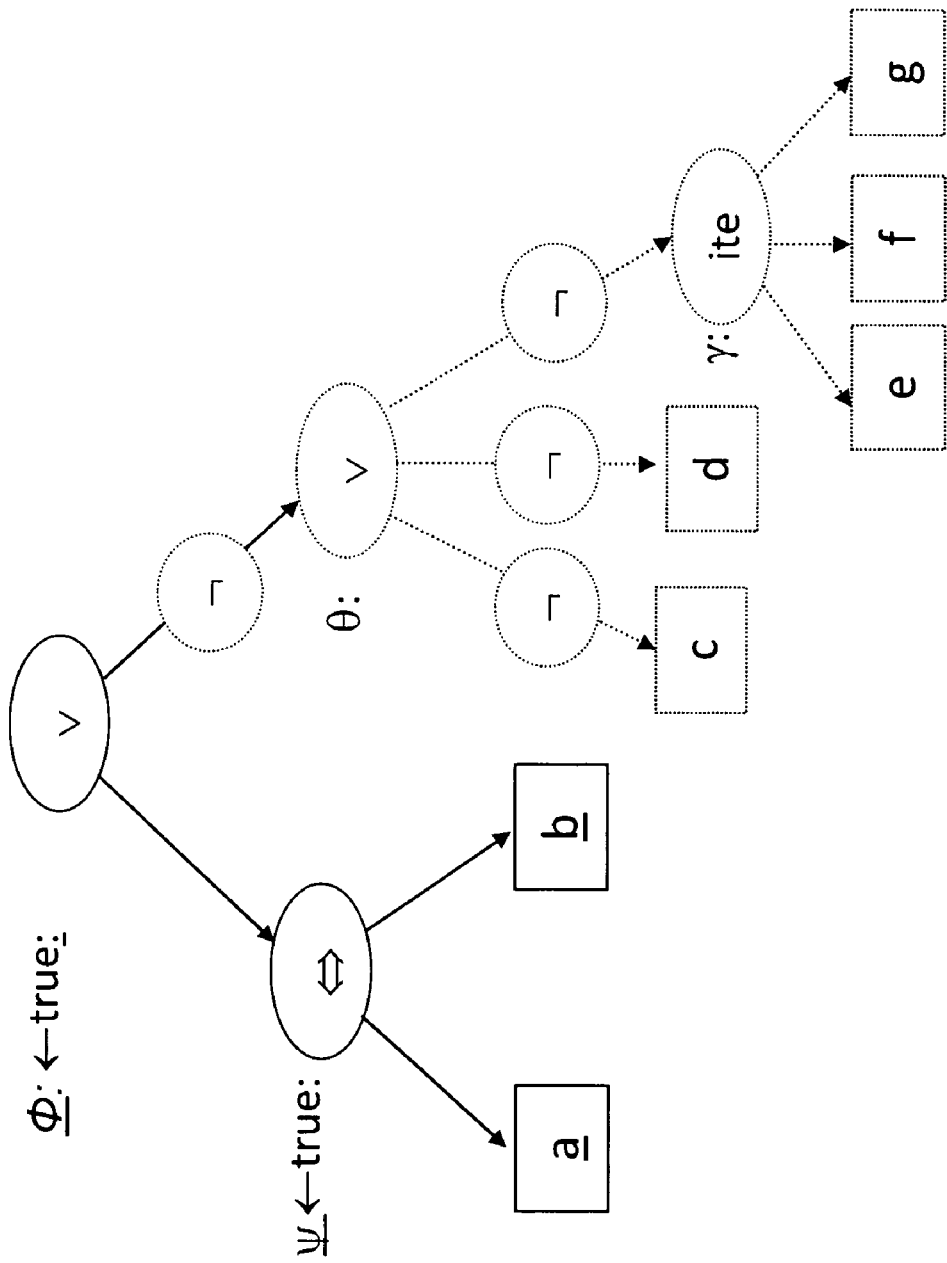
FIG. 5 is diagram of an exemplary proof search tree representing clausification of the formula of FIG. 4.

Then, the clausified form of $\phi$ is:

$\{\phi\}$ —the formula is asserted as a unit clause.
$\phi$: $\{\neg\phi, \psi, \neg\theta\}$, $\{\neg\psi, \phi\}$, $\{\theta, \phi\}$—is defined using 3 clauses.
$\psi$: $\{\neg\psi, \neg a, b\}$, $\{\neg\psi, a, \neg b\}$, $\{\psi, a, b\}$ $\{\psi, \neg a, \neg b\}$—$\psi$ is defined using 4 clauses
$\theta$: $\{\neg\theta, \neg c, \neg d, \neg\gamma\}$, $\{\theta, c\}$, $\{\theta, d\}$, $\{\theta, \gamma\}$—$\theta$ is defined using 4 clauses
$\gamma$: $\{\neg\gamma, \neg e, f\}$, $\{\neg\gamma, e, g\}$, $\{\gamma, \neg e, \neg f,\}$, $\{\gamma, e, \neg g\}$—$\gamma$ is defined using 4 clauses Initially, $\phi$ is set to true and the SAT solver 202 assigns truth values to the atoms a, b, c, d, e, f, g, $\psi$, $\theta$, and $\gamma$. If $\psi$ is set to true, then the relevancy rules 232 guide the relevant variable marker 220 to designate $\psi$ as relevant, and consequently a and b as relevant. This scenario is illustrated in FIG. 5.

Figure 6:
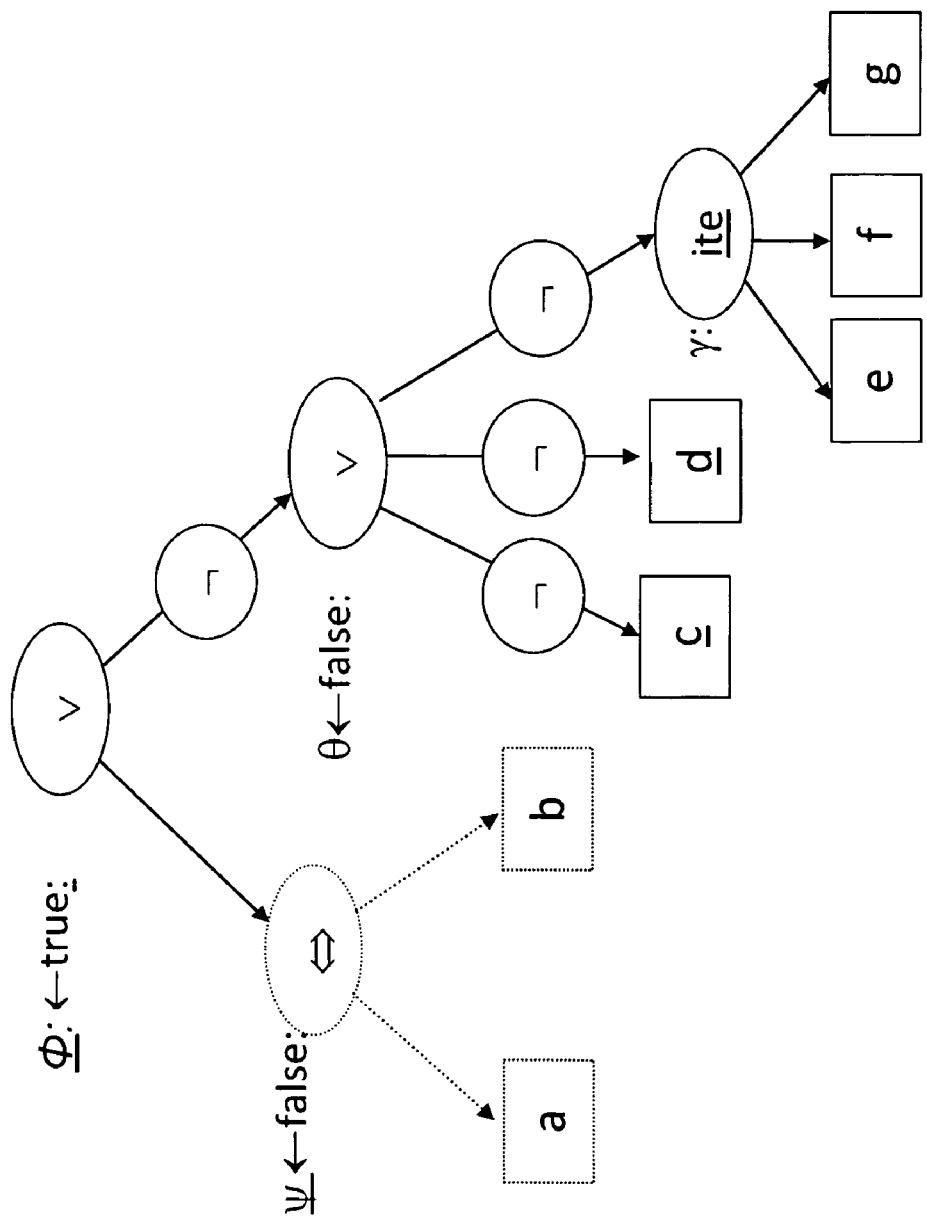
FIG. 6 is diagram of an exemplary proof search tree representing relevancy marking of the formula of FIG. 5.

On the other hand, if $\psi$ is set to false, the original set of clauses can only be satisfiable if $\theta$ is set to false (that is, $\neg\theta$ is set to true), and marked as relevant. In this case, the relevant variable marker 220 designates each of the atoms under $\theta$ as relevant. The resulting state is illustrated in FIG. 6.

Figure 7:
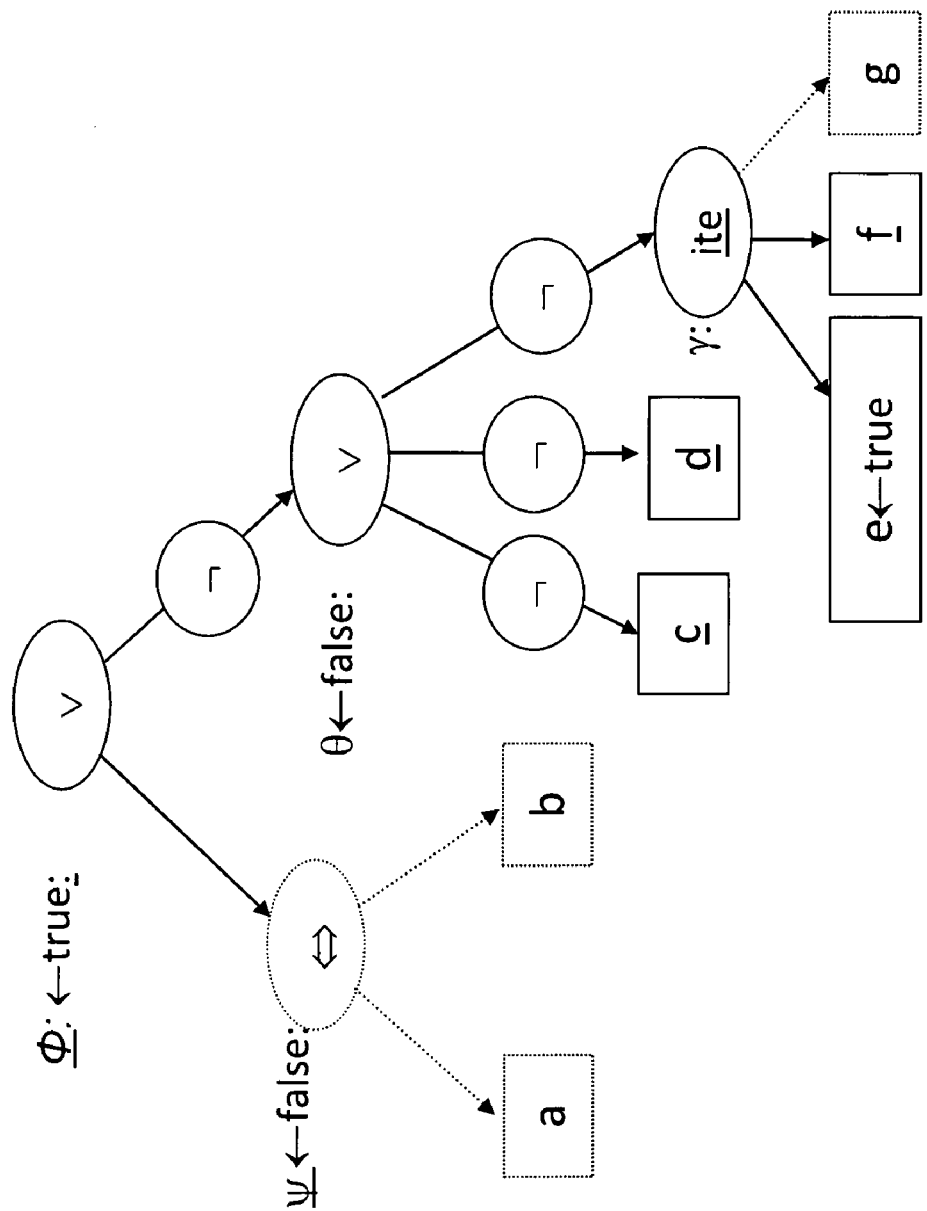
FIG. 7 is diagram of an exemplary proof search tree representing relevancy propagation in the formula of FIG. 6.

Finally, as $\gamma$ is now marked as relevant, according to the relevancy rules 232, if e is set to true, then f is marked as relevant, otherwise, if e is set to false, then g is marked as relevant. The case where e is true is illustrated in FIG. 7.

In the resulting case, the truth values of a, b, and g are ignored, while the truth values of c, d, e, and f are used for further constraint propagation.

Exemplary Methods

Figure 8:
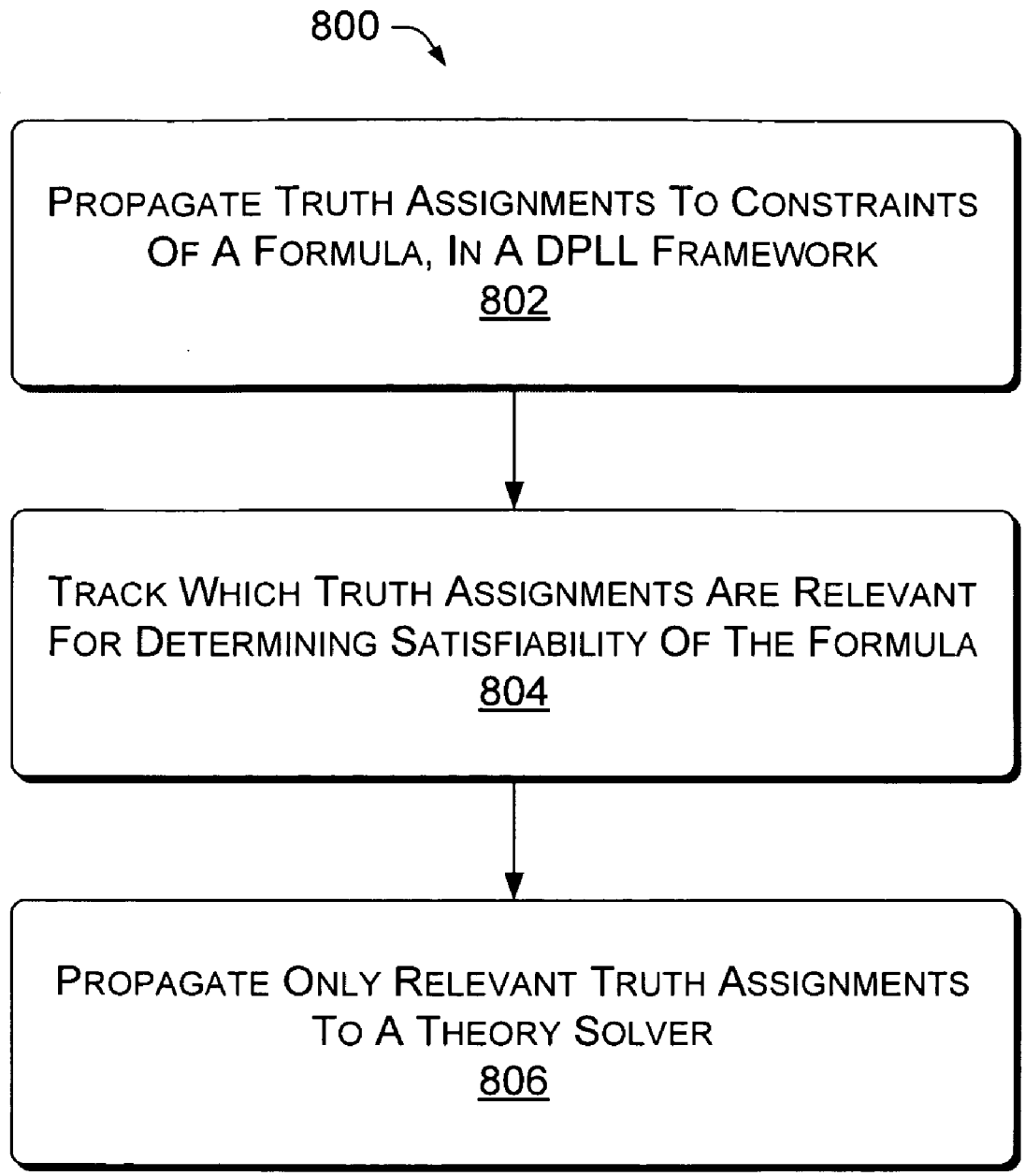
FIG. 8 is a flow diagram of an exemplary method of relevancy propagation for efficient theory combination.

FIG. 8 shows an exemplary method 800 of relevancy propagation for efficient theory combination. In the flow diagram, the operations are summarized in individual blocks. The exemplary method 800 may be performed by combinations of hardware, software, firmware, etc., for example, by components of the exemplary SMT solver 104.

At block 802, in a DPLL-based framework, truth assignments are propagated to constraints of a received formula being tested for satisfiability. Each new truth assignment may lead to additional constraint propagation, which is costly. The actual relative costliness depends on the constraint domain, for example, real or integer linear arithmetic, bit-vectors, quantified formulas, etc. For expensive constraint domains, it is very desirable to limit case splits and constraint propagation to only cases that are relevant for solving the constraints.

At block 804, the truth assignments that are relevant for determining satisfiability of the formula are tracked. In one implementation, the method 800 does not change SAT solving with respect to case-split heuristics, unit propagation, conflict resolution, etc., but may eliminate conjunctions by applying the de-Morgan rules so that the technique need only deal with disjunctions and negations. CNF conversion is applied using a variation of the Tseitin algorithm, keeping the received formula.

Each Tseitin auxiliary variable is mapped to a node in the original formula. Initially, only the auxiliary variable corresponding to the root in the original formula is marked as relevant, but relevancy is propagated to sub-formulas using relevancy rules, which in one implementation simulate Tableau-style rules. For example, assuming $\phi$ is marked as relevant:

Rule 1: Let $\phi$ be shorthand for $\vee_i \phi_i$, if $\phi$ is assigned true and is marked as relevant, then the first child $\phi_i$ that gets assigned true is marked relevant. If $\phi$ is assigned false and is marked as relevant, then all children are marked relevant.

Rule 2: Let $\phi$ be shorthand for $(\phi_1 \leftrightarrow \phi_2)$, if $\phi$ is marked as relevant, then both $\phi_1$ and $\phi_2$ are marked as relevant.

Rule 3: Let $\phi$ be ite$(\phi_1, \phi_2, \phi_3)$, if $\phi$ is marked as relevant, then $\phi_1$ is marked as relevant, and if $\phi_1$ is assigned to true(false), then $\phi_2$ ($\phi_3$) is marked as relevant.

At block 806, only relevant truth assignments are propagated to a theory solver. In one implementation, Boolean constraint propagation triggers the exemplary relevancy rules. A relevancy bit is attached to each variable. Unlike conventional DPLL(T), in which the atomic constraint attached to a Boolean variable is sent to the theory solver as soon as the variable is assigned by the SAT solver, the exemplary method 800 only sends the truth assignment of the atomic constraint to the theory solver after the variable is assigned and the relevancy bit is marked as true.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method implemented by a computing device, the method comprising:
  receiving a formula in order to determine a satisfiability of the formula;
  propagating truth assignments to atomic constraints of the formula by applying a Davis Putnam Longman Loveland (DPLL)-based technique;
  eliminating conjunctions associated with the formula;
  representing the formula by disjunctions and negations based in part on the eliminating of the conjunctions;
  tracking which truth assignments are relevant for determining satisfiability of the formula based in part on emulating a Tableau solving technique using the disjunctions and the negations; and
  propagating the truth assignments of only the relevant atomic constraints to a theory solver.

2. The method as recited in claim 1, further comprising creating relevancy propagation rules for tracking which truth assignments are relevant for determining satisfiability of the formula.

3. The method as recited in claim 2, wherein the relevancy propagation rules simulate Tableau-based rules of the Tableau solving technique for limiting constraint propagation.

4. The method as recited in claim 2, wherein the relevancy propagation rules include:
  rule 1: when $\phi$ is shorthand for $\vee_i \phi_i$, if $\phi$ is assigned true and is marked as relevant, then the first child $\phi_i$ that gets assigned true is marked relevant, while if $\phi$ is assigned false and is marked as relevant, then all children are marked relevant;
  rule 2: when $\phi$ is shorthand for $(\phi_1 \leftrightarrow \phi_2)$, if $\phi$ is marked as relevant, then both $\phi_1$ and $\phi_2$ are marked as relevant; and
  rule 3: when $\phi$ is ite$(\phi_1, \phi_2, \phi_3)$, if $\phi$ is marked as relevant, then $\phi_1$ is marked as relevant, and if $\phi_1$ is assigned to true(false), then $\phi_2(\phi_3)$ is marked as relevant, wherein ite represents an if-then-else constraint structure.

5. The method as recited in claim 2, wherein the relevancy propagation rules include:
  rule 1: when l is shorthand for $\vee\{l_1, \ldots, l_k\}$, if l is assigned true, then the first child $l_i$ that gets assigned true is marked relevant while if l is assigned false, then all children are marked relevant;
  rule 2: when l is shorthand for $\neg\vee\{l_1, \ldots, l_k\}$, if l is assigned false, then the first child $l_i$ that gets assigned true is marked relevant, while if l is assigned true, then all children are marked relevant;
  rule 3: when l is shorthand for $\neg l'$, then l' is marked as relevant as well;
  rule 4: when l is shorthand for $(\neg)(l_1 \leftrightarrow l_2)$, then both $l_1$ and $l_2$ are marked as relevant; and
  rule 5: when l is shorthand for $(\neg)(\text{ite}(l_1, l_2, l_3))$, then all of $l_1$, $l_2$ and $l_3$ are marked as relevant.

6. The method as recited in claim 2, further comprising:
  converting the received formula to a conjunctive normal form (CNF) using a variation of a Tseitin algorithm; and
  mapping each Tseitin auxiliary variable to a node in a proof search tree representing the received formula, the eliminating of the conjunctions being performed on the proof search tree.

7. The method as recited in claim 6, wherein initially only an auxiliary variable corresponding to a root in the received formula is marked as relevant, and relevancy is subsequently propagated to sub-formulas of the formula via the relevancy propagation rules.

8. The method as recited in claim 2, further comprising attaching a relevancy bit to each variable in the formula; and
  attaching a term of the formula to a variable in the formula when the variable is a shorthand for the term.

9. The method as recited in claim 8, wherein an atomic constraint associated with a Boolean variable of the formula is only sent to the theory solvers after the Boolean variable is assigned and the relevancy bit is marked as true.

10. The method as recited in claim 2, wherein the relevancy propagation rules are applied to provide a reduction in a search space covered during quantifier instantiation or to provide acceleration during reasoning about bit-vectors.

11. A Satisfiability Modulo Theories (SMT) solver, comprising:
  one or more processors communicatively coupled to memory for executing components including:
    a Davis Putnam Longman Loveland (DPLL)-based Boolean satisfiability (SAT) solver for determining satisfiability of a received formula;
    a theories solver; and
    a relevancy propagation engine associated with the SAT solver that:

creates a representation of the received formula by eliminating conjunctions associated with the received formula;

determines which atomic constraints of the received formula are relevant for determining the satisfiability of the formula based in part on using a Tableau solving technique on the representation of the received formula as part of the DPLL-based Boolean SAT solver;

propagates truth assignments of the relevant atomic constraints to the theories solver; and halts propagation of the truth assignments of irrelevant atomic constraints.

12. The SMT solver as recited in claim 11, wherein the relevancy propagation engine tracks which truth assignments are relevant for determining satisfiability of the formula via relevancy propagation rules that simulate Tableau solver rules of the Tableau solving technique for limiting constraint propagation.

13. The SMT solver as recited in claim 12, wherein the relevancy propagation rules include:

Rule 1: when $\phi$ is shorthand for $\vee_i \phi_i$, if $\phi$ is assigned true and is marked as relevant, then the first child $\phi_i$ that gets assigned true is marked relevant, while if $\phi$ is assigned false and is marked as relevant, then all children are marked relevant;

Rule 2: when $\phi$ is shorthand for $(\phi_1 \leftrightarrow \phi_2)$, if $\phi$ is marked as relevant, then both $\phi_1$ and $\phi_2$ are marked as relevant; and Rule 3: when $\phi$ is ite$(\phi_1, \phi_2, \phi_3)$, if $\phi$ is marked as relevant, then $\phi_1$ is marked as relevant, and if $\phi_1$ is assigned to true(false), then $\phi_2(\phi_3)$ is marked as relevant, wherein ite represents an if-then-else constraint structure.

14. The SMT solver as recited in claim 12, further comprising:

a conjunctive normal form (CNF) converter to format the received formula into CNF form via a Tseitin technique; and a mapper to assign each Tseitin auxiliary variable to a node in a proof search tree representing the received formula.

15. The SMT solver as recited in claim 14, wherein the mapper initially marks only an auxiliary variable corresponding to a root in the received formula as relevant, and relevancy is subsequently propagated to sub-formulas of the received formula via the relevancy propagation rules.

16. The SMT solver as recited in claim 11, further comprising a relevancy bit concatenator to attach a relevancy bit to each variable in the formula; and wherein the mapper only sends a constraint associated with a Boolean variable of the formula to the theory solver after the Boolean variable is assigned and the relevancy bit is marked as true.

17. The SMT solver as recited in claim 11, wherein the relevancy propagation rules are applied to provide a reduction in search space covered during quantifier instantiation or to provide acceleration during reasoning about bit-vectors.

18. A system, comprising:

a Satisfiability Modulo Theories (SMT) solver stored in memory and executed by at least one processor, the SMT solver for:

propagating truth assignments to constraints of a formula;

using relevancy propagation rules to determine which truth assignments are relevant, the relevancy propagation rules including:

rule 1: when $\phi$ is shorthand for $\vee_i \phi_i$, if $\phi$ is assigned true and is marked as relevant, then the first child $\phi_i$ that gets assigned true is marked relevant, while if $\phi$ is assigned false and is marked as relevant, then all children are marked relevant;

rule 2: when $\phi$ is shorthand for $(\phi_1 \leftrightarrow \phi_2)$, if $\phi$ is marked as relevant, then both $\phi_1$ and $\phi_2$ are marked as relevant; and rule 3: when $\phi$ is ite$(\phi_1, \phi_2, \phi_3)$, if $\phi$ is marked as relevant, then $\phi_1$ is marked as relevant, and if $\phi_1$ is assigned to true(false), then $\phi_2(\phi_3)$ is marked as relevant, wherein ite represents an if-then-else constraint structure;

tracking which of the truth assignments are relevant for determining satisfiability of the formula during a Davis Putnam Longman Loveland (DPLL)-based solving technique; and propagating only the relevant truth assignments to a theory solver.

* * * * *